United States Patent
Le Traon et al.

(10) Patent No.: US 6,807,872 B2
(45) Date of Patent: Oct. 26, 2004

(54) FORCE TRANSDUCER HAVING A CENTRAL PORTION OF REDUCED THICKNESS

(75) Inventors: Olivier Le Traon, Vauhallan (FR); Denis Janiaud, Les Ulis (FR); Bernard Lecorre, Meudon la Foret (FR); Serge Muller, Ollainville (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 140 days.

(21) Appl. No.: 10/217,516

(22) Filed: Aug. 14, 2002

(65) Prior Publication Data

US 2003/0000317 A1 Jan. 2, 2003

Related U.S. Application Data

(63) Continuation of application No. PCT/FR01/00210, filed on Jan. 23, 2001.

(30) Foreign Application Priority Data

Feb. 22, 2000 (FR) .......................................... 00 02214

(51) Int. Cl.$^7$ ................................................ G01L 1/04
(52) U.S. Cl. ................................................ 73/862.632
(58) Field of Search ..................... 73/862.627, 862.629, 73/862.632, 862.636, 862.637, 73, 856, 862.59, 862.61, 862.621

(56) References Cited

U.S. PATENT DOCUMENTS

| | | | |
|---|---|---|---|
| 4,215,570 A | | 8/1980 | Eer Nisse |
| 4,520,339 A | * | 5/1985 | Utsunomiya .................... 338/5 |
| 4,558,756 A | * | 12/1985 | Seed .......................... 177/211 |
| 4,623,813 A | * | 11/1986 | Naito et al. ............. 310/313 R |
| 5,415,044 A | * | 5/1995 | Yamamoto ............... 73/514.33 |
| 5,834,646 A | * | 11/1998 | Kvisteroy et al. ....... 73/514.29 |
| 5,962,786 A | | 10/1999 | Le Traon et al. |
| 6,143,993 A | * | 11/2000 | Andersson .................. 177/229 |

FOREIGN PATENT DOCUMENTS

| | | |
|---|---|---|
| FR | 2 574 209 | 6/1986 |
| FR | 2 685 964 | 6/1996 |
| FR | 2 739 190 | 11/1997 |

* cited by examiner

Primary Examiner—Max Noori
(74) Attorney, Agent, or Firm—Lawrence E. Laubscher, Sr.

(57) ABSTRACT

The invention concerns a transducer constituting the sensitive member of a sensor whose frequency varies as a function of the intensity of force applied to it. The force transducer comprises a beam having length and rectangular cross-section with thickness and width and flexionally vibrating. The beam has a thickness reduced over a central portion of its length, its width remaining constant.

8 Claims, 6 Drawing Sheets

FORCE TRANSDUCER HAVING A CENTRAL PORTION OF REDUCED THICKNESS

REFERENCE TO RELATED APPLICATION

This application is a continuation of the PCT International Application No. PCT/FR01/00210 filed Jan. 23, 2001, which is based on the French Application No. 00-02214 filed Feb. 22, 2000.

BACKGROUND OF THE INVENTION

1. Field of the Invention

The present invention relates generally to a force transducer intended to constitute the sensitive member of a force, pressure or acceleration sensor.

The invention relates more particularly to a transducer vibrating flexionally whose frequency varies as a function of the intensity of the force applied to it. The intensity of the force is determined by measuring the vibration frequency.

2. Description of the Prior Art

Generally speaking, the transducer comprises a beam with an elongate shape along a longitudinal axis and means for causing flexional vibration of this beam, one end of the transducer is fastened to a fixed part, and the force to be measured is applied to the other end of the transducer, parallel to the axis of the beam. The beam is therefore subjected to an axial tensile or compression stress, as a function of the direction of the force. The flexional resonant frequency of the beam is highly sensitive to this axial stress, and increases in the case of a tensile stress and decreases in the case of a compression stress. These phenomena are explained by the axial stresses modifying the inherent flexional stiffness of the beam; also, the very slight lengthening or shortening of the beam that results from these axial stresses has only a virtually negligible influence on the frequency variation. These phenomena are analogous to the tuning of a musical instrument, which entails modifying the tension in each string until the required resonant frequency is obtained; the principal difference between a string and a beam is that, because of its practically zero inherent stiffness, a string has no intrinsic natural vibration mode and cannot be subjected to axial compression stresses. A vibrating string force transducer therefore requires the string to be prestressed tensionally, which is the source of string vibration frequency instabilities over time or in response to variations of temperature. This is why vibrating beam force transducers are generally preferred. The reader will also have understood that the sensitivity of a vibrating beam force transducer increases as the inherent flexural stiffness of the beam decreases, and therefore in particular as the dimensions of the cross section, i.e. a section taken in a plane perpendicular to the longitudinal axis of the beam, decrease. However, this incitement to reduce the cross section dimensions of the beam has to be tempered by another consideration regarding the quality of the flexional vibration of the beam, which increases as the cross section dimension parallel to the plane of vibration increases. Measures must also be taken to prevent the quality of vibration being degraded by leakages of vibratory mechanical energy out of the device; this is why the transducer generally includes a vibratory mechanical filtering means. The quality of the vibration, as reflected in a quality factor, has an important influence on the measurement noise of the vibration frequency, and therefore of the intensity of the force to be measured. This is why the dimensions of the beam of a force transducer are generally the result of seeking a good compromise between sensitivity to forces and quality of vibration, in order to obtain a good "signal to noise" ratio in the required measurement range.

The flexional vibration of the beam is generally maintained by means of electrodes and an oscillator electronic circuit. For example, in the case of a quartz beam, the vibration is advantageously excited piezoelectrically using electrodes adhering to the crystal. Quartz is also appreciated for its mechanical qualities and for its low cost.

As a general rule, vibrating beam force transducers are appreciated for the excellent stability of their sensitivity to forces and also because, their output magnitude being a frequency, processing the information delivered by the transducer requires no analog-to-digital converter.

Figure 1:
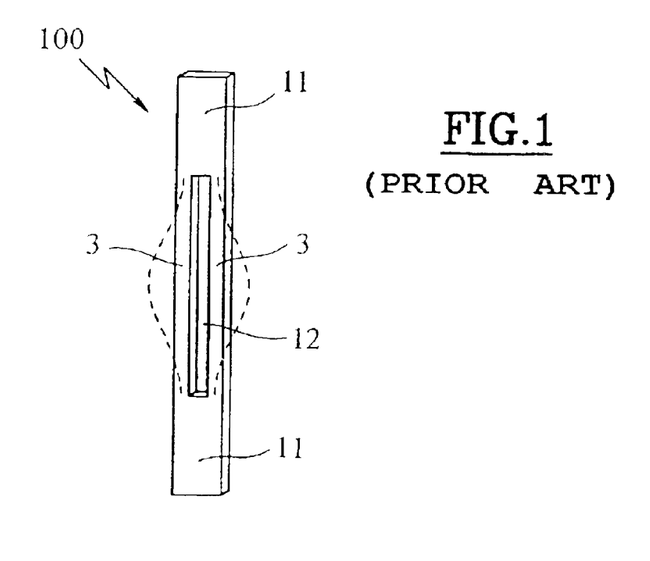

FIG. 1 shows a force transducer of the above kind, with two vibrating beams, which is the subject matter of U.S. Pat. No. 4,215,570. The body of the transducer 100 is obtained by machining a flat plate of material. The body comprises two end blocks 11 and two parallelepiped-shaped beams 3 separated by a slot 12. The two beams 3 vibrate flexionally parallel to the plane of the plate and in phase opposition, as shown in an exaggeratedly enlarged manner by the dashed lines in FIG. 1. If two beams are sufficiently similar, the vibratory loads that they exert at their ends balance out and the two end blocks 11 therefore hardly vibrate at all, which means that said end blocks can be fixed to the body (not shown) of a force, pressure or acceleration sensor without degrading the quality of vibration of the beams 3. The transducer 100 therefore provides a function mechanically filtering the vibrations of the beams 3. This transducer is suitable for measuring forces of ordinary intensities. On the other hand, this transducer has a drawback in terms of effectiveness of the mechanical filtering of the vibrations if the transducer must be sufficiently sensitive to measure forces of low intensity correctly; in this case, which in particular requires significant reduction in the dimensions of the cross section of the two beams 3, it becomes difficult to conform adequately to the condition requiring identical dimensions of said beams, which in practice degrades the effectiveness of the mechanical filtering and therefore degrades the quality of the vibrations.

To improve this aspect of measuring forces of low intensity, force transducers have been proposed with a single vibrating beam, two examples of which are described hereinafter.

Figure 2:
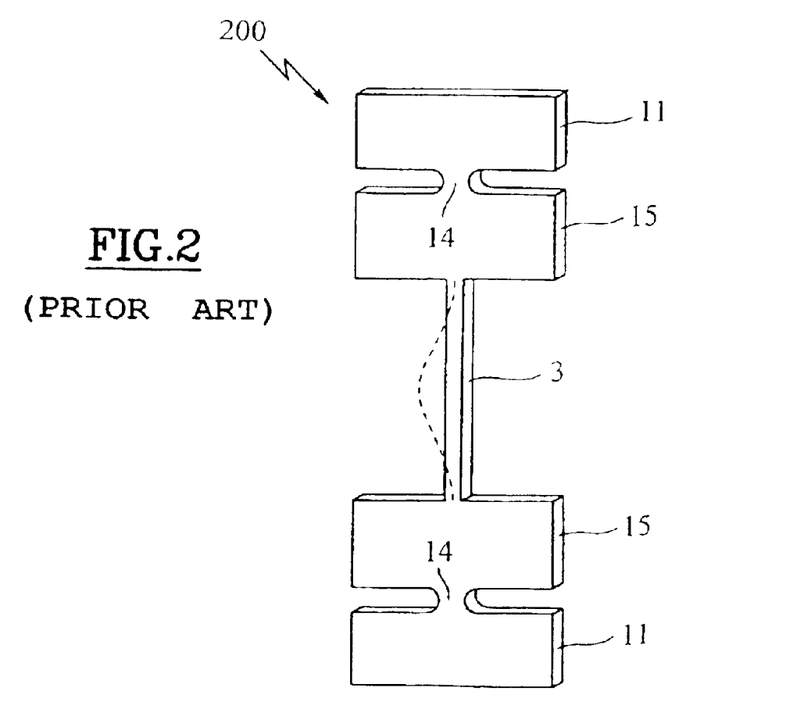

FIG. 2 shows a first force transducer with a single vibrating beam, which is the subject matter of French patent 2,574,209 in the name of the applicant. The body of the transducer 200 is obtained by machining a flat plate of material. The body comprises two end blocks 11, two rotationally flexible elements 14, two rigid inertial masses 15 and a parallelepiped-shaped beam 3. The beam 3 is subject to flexional vibration parallel to the plane of the plate, as shown in an exaggeratedly enlarged manner by the dashed line in FIG. 2. The role of the inertial masses 15 and the rotationally flexible members 14 is to provide mechanical filtering of the vibrations of the beam 3 so that the two end blocks 11 vibrate hardly at all, which enables said blocks to be fixed to the body (not shown) of a sensor without degrading the quality of the vibrations of the beam 3. The alternating displacements in rotation of the inertial masses 15 are not visible on the scale of the dashed outline depiction of the deformation in vibration of the beam 3, because they are much smaller than the amplitude of vibration of the beam 3, the deformation of which corresponds practically to that of a beam that is built in at its ends; this is due to the fact that the inertial masses 15 are significantly larger than the mass of the vibrating beam 3. It will be noted that the vibrating beam 3 and the end blocks 11 of this force transducer 200 are respectively analogous to the vibrating beams 3 and the end blocks 11 of the force transducer 11 shown in FIG. 1.

Figure 3:
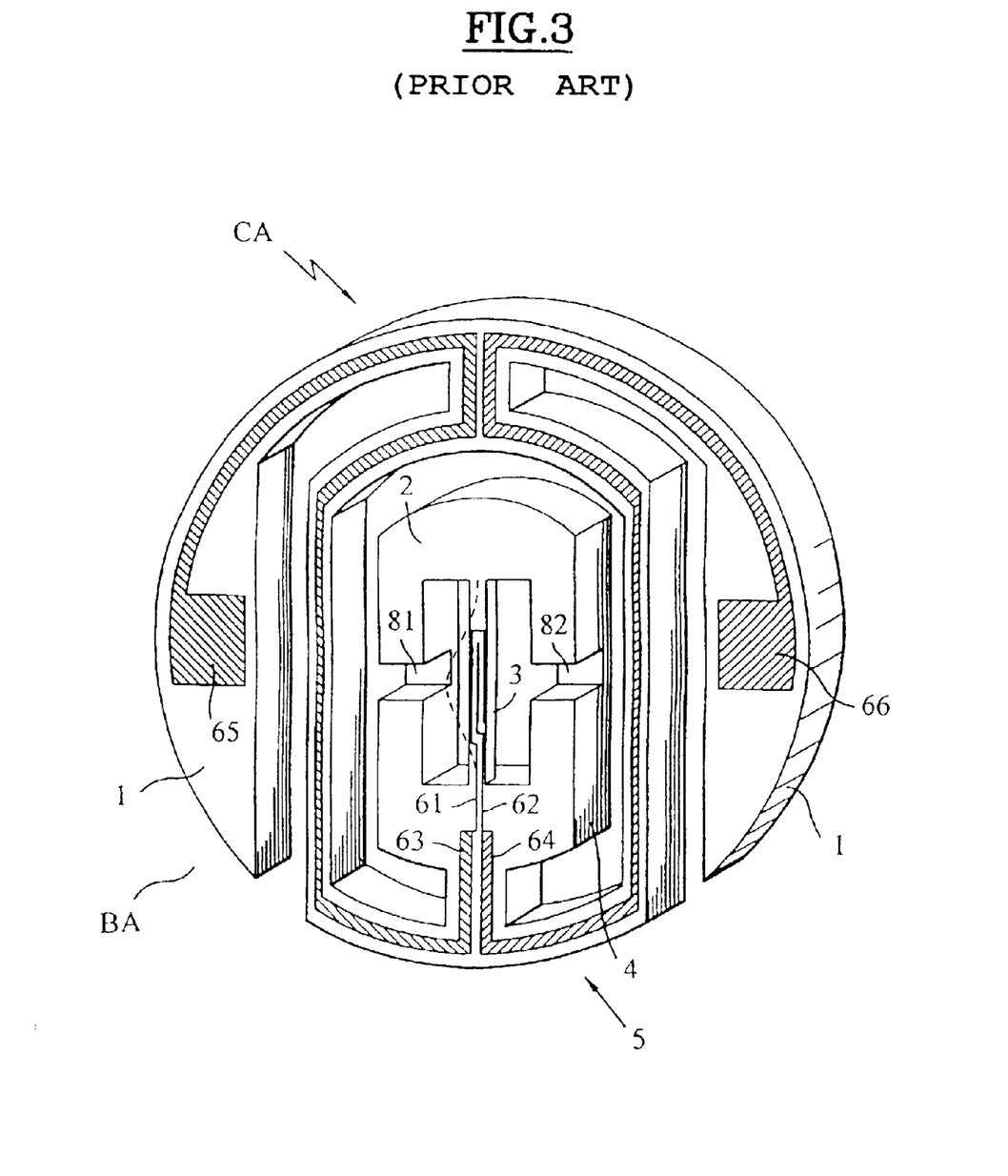
FIG. 3 is a perspective view of a prior art acceleration sensor, already commented on, in which the sensitive member of said acceleration sensor is a force transducer in the form of a single parallelepiped-shaped vibrating beam.

A second force transducer with a single vibrating beam was proposed for the monolithic acceleration sensor that is the subject matter of French patent 2,739,190 (now U.S. Pat. No. 5,962,786) in the name of the present Assignee as shown in FIG. 3. The body of this acceleration sensor CA is obtained by machining a flat quartz plate. This body comprises a fixed part 1 constituted of two segments with a disk-like shape, a flexible frame 5, a test mass 2, two articulation blades 81 and 82 for the test mass, a second mass part 4 and a force transducer 3 in the form of a single parallelepiped-shaped beam. This beam 3 flexionally vibrates parallel to the plane of the plate, shown in an exaggeratedly enlarged manner by the dashed line in FIG. 3. If the sensor CA is subjected to an acceleration substantially perpendicular to the plane of the plate, the test mass 2 exerts on the vibrating beam 3 an axial tensile or compression force which modifies the frequency of the vibration; continuous observation of said frequency indicates the instantaneous acceleration applied. The test mass 2 also has another role in the operation of the acceleration sensor CA, as the mass parts 2 and 4 and the flexible frame 5 provide mechanical filtering of the vibrations in the beam 3, so that the fixed part 1 of the sensor CA hardly vibrates at all, which enables said fixed part to be fixed to a case base BA (not shown) without degrading the quality of the vibrations of the beam 3. The alternating displacements in translation of the mass parts 2 and 4 are not visible on the scale of the dashed outline depiction of the deformation in vibration of the beam 3, because they are much smaller than the amplitude of vibration of the beam 3, the deformation of which corresponds practically to that of a beam that is built in at its ends; this is due to the fact that the masses of the parts 2 and 4 are significantly greater than the mass of the vibrating beam 3. Thus the mechanical filtering of the vibrations of the force transducer 3 is effected externally of said force transducer, and not inside it, as is the case in the force transducers 100 and 200 shown in FIGS. 1 and 2, respectively. FIG. 3 also shows piezoelectric means for causing the beam 3 to vibrate flexionally, in the form of two metal electrodes 61 and 62 having opposite polarities and acting principally on the central half of the length of the beam 3, because they have a "three-track" configuration which alternately excites mechanical tensile and compression stresses of the fiber in the beam 3, as explained in French patent 2,685,964 in the name of the applicant. Electrical connections between the electrodes 61 and 62 and sealed feed-throughs (not shown) in the base of the case are provided in the level of the two disk-like shaped segments 1 by soldering to metal contact pads 65 and 66 connected to the electrodes 61 and 62 by two metal conductor strips 63 and 64.

The effectiveness of the mechanical filtering of the vibrations of the devices with a single vibrating beam shown in FIGS. 2 and 3 depends on the mass ratio between the mass parts and the beam, and consequently there is no particular difficulty in preserving effectiveness of the filtering when the cross section dimensions of the single beam have to be reduced. This is why these devices with a single vibrating beam are more suitable for measuring forces of low intensity than the device with two vibrating beams shown in FIG. 1.

Figure 4:
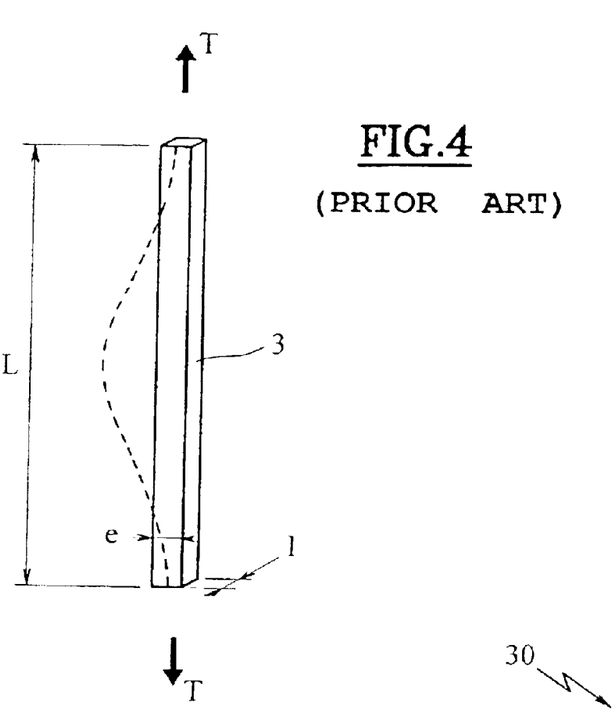
FIG. 4 is a perspective view of a prior art parallelepiped-shaped vibrating beam, already commented on, able to constitute any of the vibrating beams of the prior art devices shown in FIGS. 1, 2 and 3.

However, as previously explained, reducing the cross section dimensions of the beam is subject to a limitation due to the resulting reduction of the quality factor. This limitation can be modeled theoretically in the usual case of a parallelepiped-shaped beam with a rectangular cross section as used in the prior art. To this end, the expression "thickness e" refers to the dimension of the cross section taken parallel to the plane of vibration and the expression "width l" refers to the other cross section dimension, as shown in FIG. 4, which represents a beam 3 of length L vibrating flexionally and able to constitute any one of the beams 3 in the prior art devices shown in FIGS. 1, 2 and 3. Furthermore, F denotes the frequency of flexional vibration of the beam 3 in the absence of any axial tensile or compression force, Q denotes the quality factor of the vibration, and $\Delta F$ is the variation of frequency generated by an axial force T.

It is known that the frequency variation $\Delta F$ can be written in the following form:

$$\Delta F = \lambda \times T / (l \times e^2)$$

where $\lambda$ is a coefficient depending on mechanical characteristics of the material.

The above expression for the frequency variation $\Delta F$ is independent of the length L of the beam 3.

With regard to the quality factor Q of the vibration, the person skilled in the art also knows that its value depends on exchanges of heat between the fibers of the beam that are alternately stretched and compressed, and that theoretical modeling of this thermodynamic phenomenon provides the following expression for the quality factor Q:

$$Q \# \mu \times F \times e^2$$

in which $\mu$ is a coefficient depending on mechanical and thermal characteristics of the material.

The above expression for the quality factor Q does not include the length L of the beam 3 explicitly, but it is known that L conditions the frequency F.

The above expressions for the sensitivity $\Delta F$ to an axial force and for the quality factor Q of the vibration show clearly the important influence of the thickness e, and to be more precise show that an increase in sensitivity obtained by reducing the thickness e is accompanied by a commensurate reduction in the quality factor, all other things being equal. Optimizing the dimensions of the beam is therefore a matter of seeking the most suitable compromise for the target application. To show more clearly this antagonistic relationship between the sensitivity to an axial force and the quality of the vibration, it is useful to introduce a function $\psi$ characteristic of the rectangular cross section parallelepiped-shaped beam and defined as being the product of $\Delta F$ and Q:

$$\psi = \Delta F \times Q \# \lambda \times \mu \times F \times T / l$$

Thus the function $\psi$ does not depend explicitly on the thickness e, but only the frequency F, the width l, thermoelastic characteristics of the material, and the axial force T.

It is advantageous to apply conditions that maximize the value of the function $\psi$, because this improves the compromise between the sensitivity $\Delta F$ to the force T and the quality factor Q of the vibration. To this end, it is therefore necessary to choose the highest possible frequency F allowing for other considerations, for example the influence of temperature, and the smallest possible width l allowing for other considerations, for example the resistance to buckling of the beam, which must withstand axial compression forces in the required measurement range. Moreover, where the material is concerned, it is generally not realistic to aim to increase the coefficients $\lambda$ and $\mu$ because the choice of the material is frequently dictated by other, stronger considerations, for example constraints applying to industrial manufacture; it may nevertheless be stated that quartz and silicon, which are widely used in the industry, have satisfactory coefficients λ and μ.

Accordingly, the function ψ reflects thus a limitation of the performances of force transducers with a rectangular cross section parallelepiped-shaped vibrating beam.

OBJECT OF THE INVENTION

The present invention aims to improve the performance of the known vibrating beam force transducers previously described by proposing a geometrical shape for the vibrating beam that pushes back the performance limitation inherent to the usual parallelepiped shape.

SUMMARY OF THE INVENTION

According to the invention, the vibrating beam is characterized in that the thickness of said beam is reduced over a central portion of its length and its width is constant.

Thus it is possible to improve the compromise between the sensitivity ΔF to an axial force and the quality factor Q of the vibration by obtaining for the product ΔF×Q a value greater than that corresponding to a parallelepiped-shaped beam.

Thus it is possible to improve the sensitivity ΔF of the transducer by holding the quality factor Q, which produces a more accurate transducer and thus one that is better suited to measuring forces of low intensities.

In a similar fashion, it is equally possible to increase the quality factor Q by holding the sensitivity ΔF, which reduces measurement noise and provides a transducer of improved resolution.

More generally, between these two extreme situations, the beam according to the invention provides a transducer of better performance than a parallelepiped-shaped beam.

It must be understood that the invention does not relate only to measuring forces of low intensities and that the use of the beam according to the invention instead of the parallelepiped-shaped beam of devices like those shown in FIGS. 1, 2 and 3, for example, improves the performance of said devices.

According to a preferred embodiment, the beam comprises two end portions which are substantially identical and a central portion, the thickness of the central portion is substantially half the thickness of the end portions, and the length of the central portion is substantially equal to the length of each of the end portions.

According to another preferred embodiment, the thickness of the beam decreases continuously from the ends of the beam to the middle of its length.

BRIEF DESCRIPTION OF THE DRAWINGS

Other features and advantages of the invention will become more clearly apparent on reading the detailed description and from the drawings to which it relates, in which:

FIG. 1 is a perspective view of a prior art force transducer with two vibrating beams, already commented on;

FIG. 2 is a perspective view of a prior art force transducer with a single vibrating beam, already commented on;

DETAILED DESCRIPTION OF THE PREFERRED EMBODIMENTS

Figure 5A:
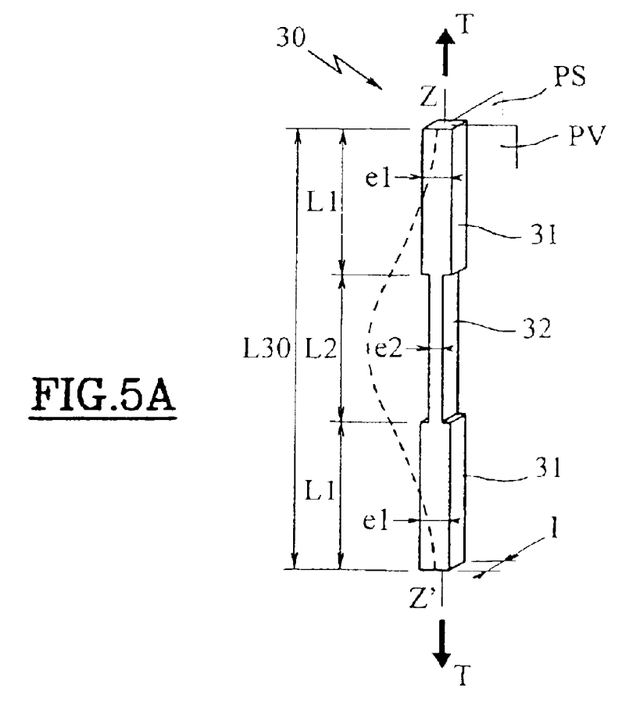
FIG. 5A is a perspective view of a first embodiment of a vibrating beam according to the invention.

Referring to FIG. 5A, a vibrating beam 30 according to the invention has two end portions 31 and a central portion 32. In the embodiment shown in FIG. 5A, the beam 30 extends along a central longitudinal axis Z'Z contained in a median plane of vibration PV and a plane PS perpendicular to the plane PV, which planes PV and PS are planes of symmetry of the beam.

Each end portion 31 is parallelepiped-shaped with a length L1 taken along the axis Z'Z, a thickness e1 taken parallel to the plane PV and a width l taken parallel to the plane PS.

The central portion 32 is parallelepiped-shaped with a length L2 taken along the axis Z'Z, a thickness e2 taken parallel to the plane PV, and a width l taken parallel to the plane PS. Thus the total length L30 of the beam is L1+L2+L1 and its width l is constant. To facilitate the comparison in the following description of the beam according to the invention shown in FIG. 5A and the prior art parallelepiped-shaped beam shown in FIG. 4, the same width l is used. In the embodiment shown in FIG. 5A, the thickness e2 of the central portion 32 is substantially half the thickness e1 of the end portions 31; e2 lies generally between one third and two thirds of the greatest thickness e1 at the ends of the beam. In the embodiment shown, the length L2 of the central portion 32 is substantially equal to the length L1 of each of the end portions 31; L2 lies generally between half and twice the length L1.

Figure 5B:
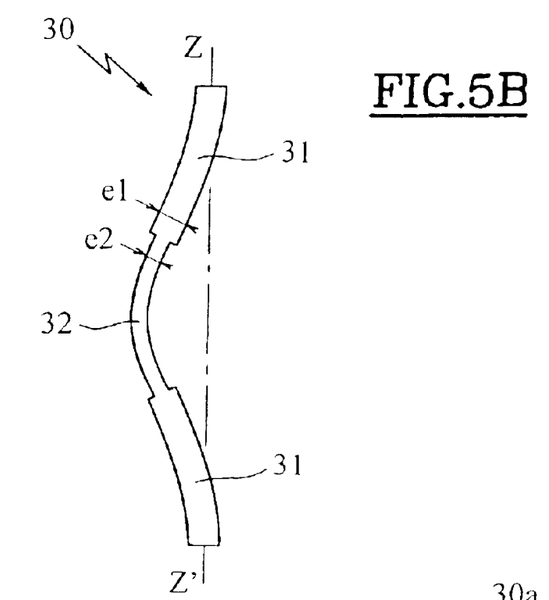
FIG. 5B is a front view of the vibrating beam from FIG. 5A showing the exaggeratedly enlarged deformations of the two end portions and the central portion to explain how each of said portions contributes in a balanced fashion to flexional vibration of the beam.

The operation of the vibrating beam according to the invention is now described with reference to FIG. 5B, which shows in an exaggeratedly enlarged manner the deformation of the beam 30 from FIG. 5A vibrating flexionally parallel to the plane PV. The general form of said deformation, also shown in dashed line in FIG. 5A, is substantially the same as that of the parallelepiped-shaped beam 3 shown in FIG. 4. In other words, the two thickness discontinuities at the transitions from e1 to e2 do not significantly modify the form of the deformation in vibration of the beam. This is because, the mechanical stresses being more intense in the vicinity of the built-in ends of the beam, the deformation of the end portions 31 is of the same order of magnitude as that of the central portion 32, provided that the flexibility of the end portions 31 is in harmony with that of the central portion 32, which is achieved in practice if the thickness e2 is at least equal to one third of the thickness e1 and the length L2 is from half to twice the length L1. Accordingly, the vibration of the beam 30 in accordance with the invention results from a substantially balanced sharing of the work of the end portions 31 and the work of the central portion 32. It is noticed that it is not necessary for the two end portions 31 to be strictly identical for the beam according to the invention to work, as is the case in the embodiment illustrated in FIG. 5A; if said end portions have significantly different lengths or thicknesses, but still conform to the dimension conditions stated above with reference to the central portion 32, the performances of the transducer are worse than in the case of the two strictly identical end portions, but are nevertheless still improved compared to that of the known transducers.

In an analogous fashion to the case previously explained of the parallelepiped-shaped beam, it is useful to introduce a function $\psi'$ characteristic of the performances of the beam according to the invention. To this end, F' denotes the frequency of flexional vibration of the beam according to the invention in the absence of any axial tensile or compression force, Q' is the quality factor of this vibration, and $\Delta F'$ is the frequency variation generated by an axial force T, and the function $\psi'$ is defined as the product of $\Delta F'$ and Q':

$$\psi' = \Delta F' \times Q'$$

In the case of the beam 30 illustrated in FIG. 5A, in which e2 is substantially half e1 and L2 is substantially equal to L1, the function $\psi'$ can be written in the form:

$$\psi' \# 1.4 \times \lambda \times \mu \times F' \times T/l$$

where $\lambda$ and $\mu$ are the previously used coefficients characterizing the thermo-elastic behavior of the material.

Accordingly, for the same vibration frequency F'=F, the beam according to the invention yields a value of $\psi'$ approximately 1.4 times greater than the value of $\psi$ defined for the parallelepiped-shaped beam.

This improves the compromise between the sensitivity $\Delta F'$ to an axial force and the quality factor Q' of the vibration.

It is therefore possible to increase the sensitivity $\Delta F'$ of the force transducer by 40% by holding the same quality factor Q'=Q, which provides a more accurate transducer which is therefore more suitable for measuring forces of low intensities.

In an analogous fashion, it is equally possible to increase the quality factor Q' by 40% by holding the same sensitivity $\Delta F' = \Delta F$, which is favorable to reducing measurement noise and produces a transducer of improved resolution.

More generally, between these two extreme cases, the beam according to the invention provides a transducer offering better performance than the parallelepiped-shaped beam.

Figure 6:
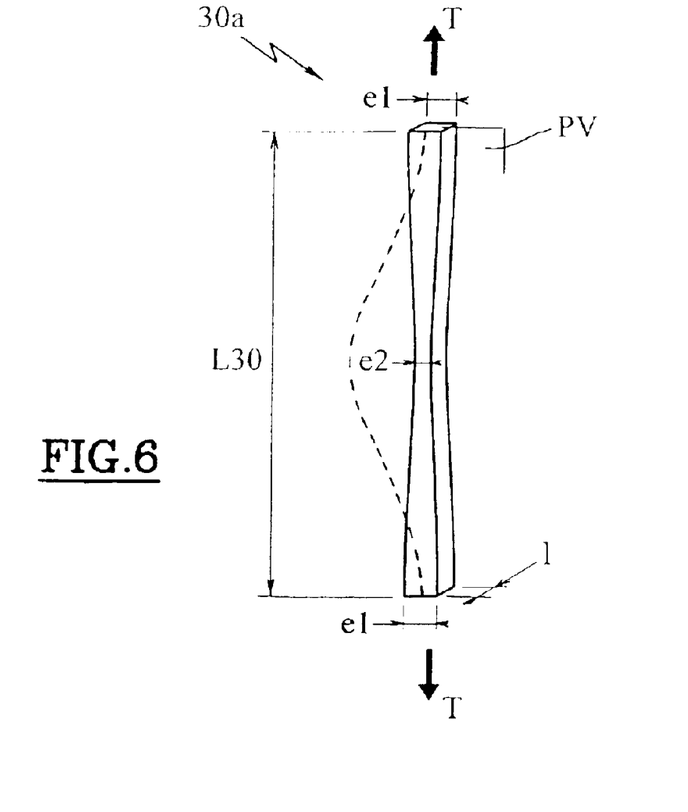
FIG. 6 is a perspective view of another embodiment of a vibrating beam according to the invention.

FIG. 6 shows another embodiment of a vibrating beam according to the invention. The vibrating beam 30a differs from the vibrating beam 30 of FIG. 5 principally by the progressive evolution of its thickness along its length L30; said thickness thus decreases continuously from the thickness e1 of the ends of the beam to the thickness e2 at the middle of the length L30, in the central portion of the beam. In the same way as for the vibrating beam 30, the vibrating beam 30a vibrates flexionally parallel to the plane PV and the thickness e2 lies generally between one third and two thirds the thickness e1. The vibrating beam 30a offers the same advantages as the ones of the vibrating beam 30 with regard to measurement accuracy and resolution.

The vibrating beam according to the invention can take forms other than that of the beam with three portions of the embodiment shown in FIG. 5A or that whose thickness evolves progressively, as in the embodiment shown in FIG. 6. To be more precise, the beam according to the invention can have an intermediate shape comprising (2n+1) parallelepiped-shaped portions disposed along its length (L30), where n is an integer greater than 1, what is important being that the thicknesses of said portions decrease from the ends of the beam toward its central portion, which can comprise a plurality of portions, and that the thickness of the central portion is from one third to two thirds the thickness of the end portions.

Figure 7:
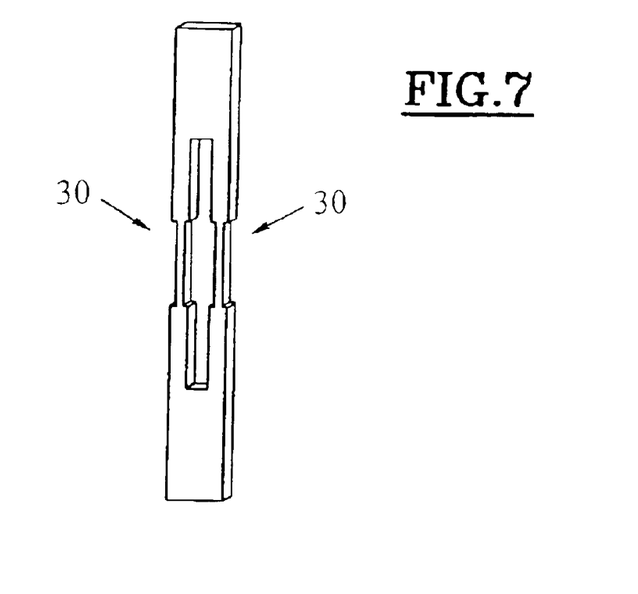
FIG. 7 is a perspective view of a force transducer based on the known transducer with two vibrating beams shown in FIG. 1, and in which the two parallelepiped-shaped beams 3 have been replaced with two beams 30 embodying the invention.
Figure 8:
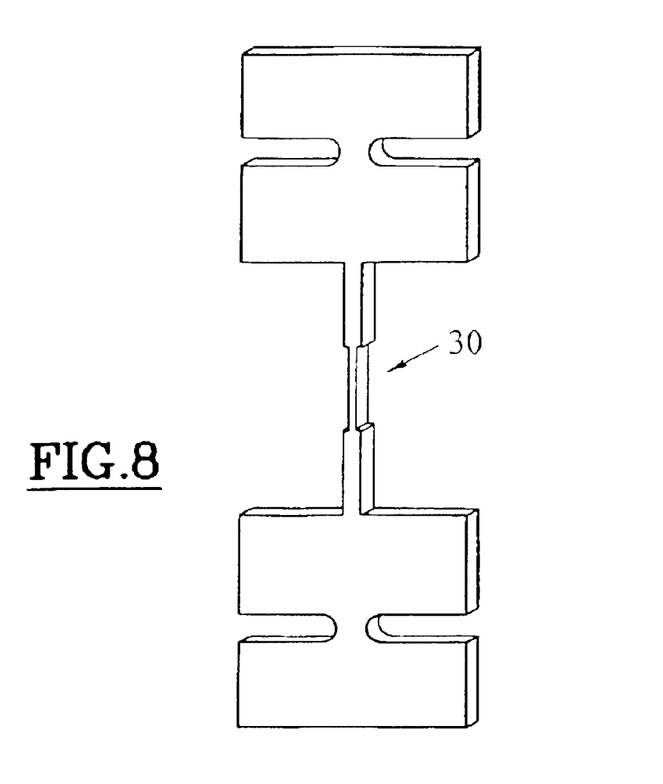
FIG. 8 is a perspective view of a force transducer based on the known transducer with a single vibrating beam illustrated in FIG. 2, and in which the parallelepiped-shaped beam 3 has been replaced by a beam 30 embodying the invention.

FIGS. 7 and 8 show force transducers based on the known transducers illustrated in FIGS. 1 and 2, respectively, but in which the parallelepiped-shaped vibrating beams 3 have been replaced by vibrating beams 30 conforming to the invention, which improves the performance of said known transducers.

Figure 9:
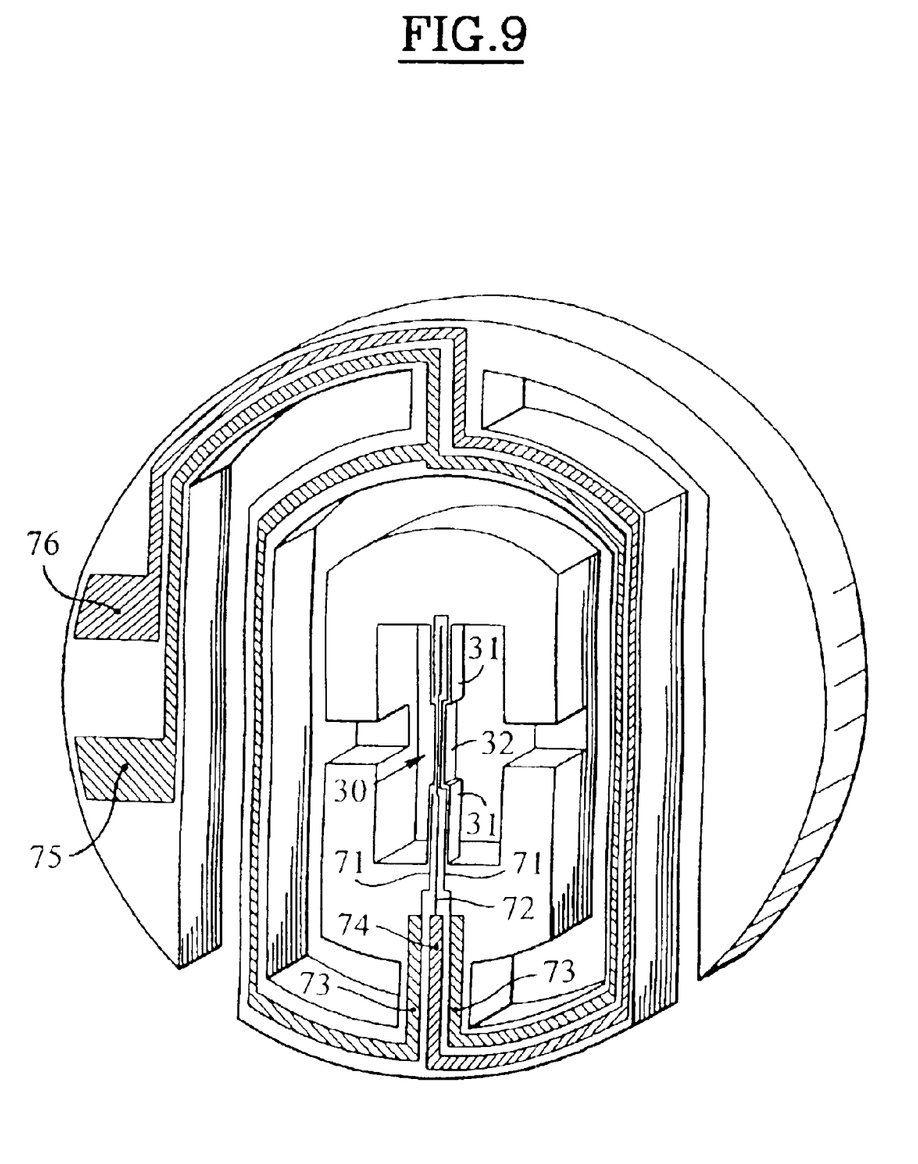
FIG. 9 is a perspective view of an acceleration sensor based on the known sensor illustrated in FIG. 3, and in which the parallelepiped-shaped beam 3 has been replaced with a beam 30 embodying the invention.

FIG. 9 shows a monolithic acceleration sensor based on the prior art sensor shown in FIG. 3, but in which the parallelepiped-shaped vibrating beam 3 has been replaced by a beam 30 conforming to the invention, which improves the performance of said known sensor.

FIG. 9 also shows means for imparting flexional vibration to the beam 30 by piezoelectric effect, in the form of two metal electrodes 71 and 72 having opposite polarities and acting principally on the two end portions 31 thanks to a "three-track" configuration, the two tracks disposed on the central portion 32 having only a role of electrical connection between the electrodes on the end portions. Conductive metal strips 73 and 74 connect the electrodes 71 and 72 to the contact pads 75 and 76. In the case of progressively evolving beams or beams with (2n+1) portions, the electrodes are disposed on the beam in the vicinity of its end, the two tracks disposed on the central portion having only an electrical connection role.

What we claim is:

1. A force transducer comprising a beam adapted for flexional vibration and having longitudinally-extending orthogonally-arranged sensitivity (PS) and vibration (PV) planes of symmetry, respectively, said beam having a rectangular cross-section and including a pair of end portions, and a central portion contained between said end portions, said beam having a width dimension (1) extending in said plane of sensitivity that is constant, said beam having a thickness dimension extending in said plane of vibration that is less in said central portion (e2) than in said end portions (e1).

2. A force transducer according to claim 1, wherein said beam thickness in the middle of said beam length lies between one third and two thirds the greatest thickness at ends of said beam.

3. A force transducer according to claim 1, wherein said beam comprises an odd integer number of parallelepiped-shaped disposed along along said beam length, said portions having thickness decrease from end portions of said beam toward said central portion.

4. A force transducer according to claim 3, wherein said end portions are substantially identical, and said central portion has a length which lies between half and twice the length of each of said end portions.

5. A force transducer according to claim 4, wherein the thickness of said central portion is substantially half the thickness of said end portions, and said central portion and said end portions have substantially equal lengths.

6. A force transducer according to claim 1, wherein the thickness of said beam decreases progressively from each end of said beam toward the center of said beam.

7. A force transducer according to claim 1, comprising means including electrodes disposed in the vicinity of ends of said beam for imparting flexional vibration to said beam.

8. A force transducer according to claim 7, wherein said electrodes are connected by electrical connection tracks disposed on said central portion of said beam.

* * * * *